(12) United States Patent
Kondou et al.

(10) Patent No.: US 11,994,230 B2
(45) Date of Patent: May 28, 2024

(54) SOLENOID VALVE

(71) Applicant: DENSO CORPORATION, Kariya (JP)

(72) Inventors: Shinichi Kondou, Kariya (JP); Masato Arai, Kariya (JP); Kazuhiro Sasao, Kariya (JP)

(73) Assignee: DENSO CORPORATION, Kariya (JP)

( * ) Notice: Subject to any disclaimer, the term of this patent is extended or adjusted under 35 U.S.C. 154(b) by 247 days.

(21) Appl. No.: 17/569,234

(22) Filed: Jan. 5, 2022

(65) Prior Publication Data

US 2022/0128166 A1 Apr. 28, 2022

Related U.S. Application Data

(63) Continuation of application No. PCT/JP2020/027923, filed on Jul. 17, 2020.

(30) Foreign Application Priority Data

Jul. 22, 2019 (JP) ................. 2019-134444

(51) Int. Cl.
*F16K 31/06* (2006.01)
*F16K 27/04* (2006.01)
*H01F 7/08* (2006.01)
*H01F 7/16* (2006.01)

(52) U.S. Cl.
CPC ........ *F16K 31/0675* (2013.01); *F16K 27/048* (2013.01); *F16K 31/0668* (2013.01); *H01F 7/081* (2013.01); *H01F 7/1607* (2013.01); *H01F 2007/085* (2013.01)

(58) Field of Classification Search
CPC .. H01F 2007/085; H01F 7/081; H01F 7/1607; F16K 31/0675; F16K 27/048; F16K 31/0668
See application file for complete search history.

(56) References Cited

U.S. PATENT DOCUMENTS

| 7,053,741 | B2* | 5/2006 | Tojo ............... F02M 63/0015 335/220 |
| 2006/0243938 | A1 | 11/2006 | Ishibashi |
| 2015/0240795 | A1 | 8/2015 | Yoshihiro |

(Continued)

FOREIGN PATENT DOCUMENTS

| JP | 2012-002239 | 1/2012 |
| JP | 2014-055597 | 3/2014 |

(Continued)

*Primary Examiner* — Daphne M Barry
(74) *Attorney, Agent, or Firm* — Nixon & Vanderhye P.C.

(57) ABSTRACT

A solenoid valve includes a valve portion and a solenoid portion. The valve portion has a sleeve and a valve body inserted into the sleeve. The solenoid portion includes a stator core having a magnetic attraction core, a sliding core, a magnetic flux passage suppressing portion that suppresses the passage of magnetic flux between the sliding core and the magnetic attraction core, a magnetic yoke, a coil portion, a plunger, and a magnetic tubular base portion. The base portion is fastened to a first outer peripheral surface of an end on the solenoid portion side in the axial direction of the sleeve, is arranged outside a radial direction of a second outer peripheral surface of the end on the valve portion side in the axial direction of the magnetic attraction core, and comes into contact with the yoke inside the yoke.

9 Claims, 5 Drawing Sheets

(56) References Cited

U.S. PATENT DOCUMENTS

2015/0240796 A1     8/2015   Yoshihiro
2015/0241101 A1     8/2015   Yoshihiro
2015/0260176 A1     9/2015   Yoshihiro
2017/0167617 A1*    6/2017   Layne ................ F16K 31/0613

FOREIGN PATENT DOCUMENTS

JP      2017-161014     9/2017
WO      2019/017251     1/2019

* cited by examiner

SOLENOID VALVE

CROSS REFERENCE TO RELATED APPLICATIONS

This application is a continuation application of International Patent Application No. PCT/JP2020/027923 filed on Jul. 17, 2020, which designated the U.S. and based on and claims the benefits of priority of Japanese Patent Application No. 2019-134444 filed on Jul. 22, 2019. The entire disclosure of all of the above applications is incorporated herein by reference.

TECHNICAL FIELD

The present disclosure relates to a solenoid valve.

BACKGROUND

Conventionally, a solenoid valve includes a solenoid portion in which a plunger slides inside a stator core and a valve portion having a sleeve into which a valve body is inserted inside a coil that generates a magnetic force by energization.

SUMMARY

The present disclosure can be realized as the following embodiments.

According to one embodiment of the present disclosure, a solenoid valve including a valve portion and a solenoid portion is provided. The valve portion has a tubular sleeve extending along an axial direction, and a valve body that is inserted into the sleeve and slides in the axial direction, and in which a shaft for transmitting a thrust of the solenoid portion to the valve portion is arranged at an end on the solenoid portion side in the axial direction.

The solenoid portion includes a tubular coil portion that generates magnetic force when energized, a magnetic yoke having a side surface portion along an axial direction and a bottom portion formed along a direction intersecting the axial direction, and accommodating the coil portion, a columnar plunger that slides in the axial direction, a stator core including a magnetic attraction core arranged in the axial direction to face a distal end surface of the plunger and configured to attract magnetically the plunger by a magnetic force generated by the coil portion, a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and a magnetic flux passage suppressing portion configured to suppress passage of magnetic flux between the sliding core and the magnetic attraction core; and a cylindrical magnetic base portion that is fastened to a first outer peripheral surface of an end on the solenoid portion side in the axial direction of the sleeve, is arranged outside a radial direction of a second outer peripheral surface of the end on the valve portion side in the axial direction of the magnetic attraction core, and comes into contact with the yoke inside the yoke.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In an assumable example, a solenoid valve includes a solenoid portion in which a plunger slides inside a stator core and a valve portion having a sleeve into which a valve body is inserted inside a coil that generates a magnetic force by energization. In the solenoid valve, a flange portion formed on the sleeve and a yoke of the solenoid portion are fastened by caulking so that the solenoid portion and the valve portion are fixed.

In the embodiment described above, the manufacturing cost of the solenoid valve is increased by forming a collar portion on the sleeve. Therefore, a new technique for fastening the solenoid portion and the valve portion, which can suppress the manufacturing cost of the solenoid valve, is desired.

The present disclosure can be realized as the following embodiments.

According to one embodiment of the present disclosure, a solenoid valve including a valve portion and a solenoid portion is provided. The valve portion has a tubular sleeve extending along an axial direction, and a valve body that is inserted into the sleeve and slides in the axial direction, and in which a shaft for transmitting a thrust of the solenoid portion to the valve portion is arranged at an end on the solenoid portion side in the axial direction.

The solenoid portion includes a tubular coil portion that generates magnetic force when energized, a magnetic yoke having a side surface portion along an axial direction and a bottom portion formed along a direction intersecting the axial direction, and accommodating the coil portion, a columnar plunger that slides in the axial direction, a stator core including a magnetic attraction core arranged in the axial direction to face a distal end surface of the plunger and configured to attract magnetically the plunger by a magnetic force generated by the coil portion, a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and a magnetic flux passage suppressing portion configured to suppress passage of magnetic flux between the sliding core and the magnetic attraction core; and a cylindrical magnetic base portion that is fastened to a first outer peripheral surface of an end on the solenoid portion side in the axial direction of the sleeve, is arranged outside a radial direction of a second outer peripheral surface of the end on the valve portion side in the axial direction of the magnetic attraction core, and comes into contact with the yoke inside the yoke.

According to the solenoid valve of this configuration, the base portion is fastened to the first outer peripheral surface of the end on the solenoid portion side in the axial direction of the sleeve, and is arranged outside the radial direction of the second outer peripheral surface of the end on the valve portion side in the axial direction of the magnetic attraction core. Therefore, the solenoid portion and the valve portion can be fastened by the base portion. Therefore, compared with a configuration in which a flange portion is formed on the sleeve of the valve portion and the solenoid portion and the valve portion are fastened by caulking and fixing the flange portion and the yoke, the structure of the sleeve can be simplified and the manufacturing cost of the solenoid valve can be suppressed. Further, since the base portion made of the magnetic material is arranged outside the second outer peripheral surface of the magnetic attraction core in the radial direction and comes into contact with the yoke inside the yoke, the base portion can transfer the magnetic flux between the magnetic attraction core and the yoke. Therefore, it is possible to form a magnetic circuit while suppressing the manufacturing cost.

The present disclosure can be realized as the following embodiments. For example, the present disclosure can be realized in the embodiment of a method of manufacturing.

A. First Embodiment

Figure 1:
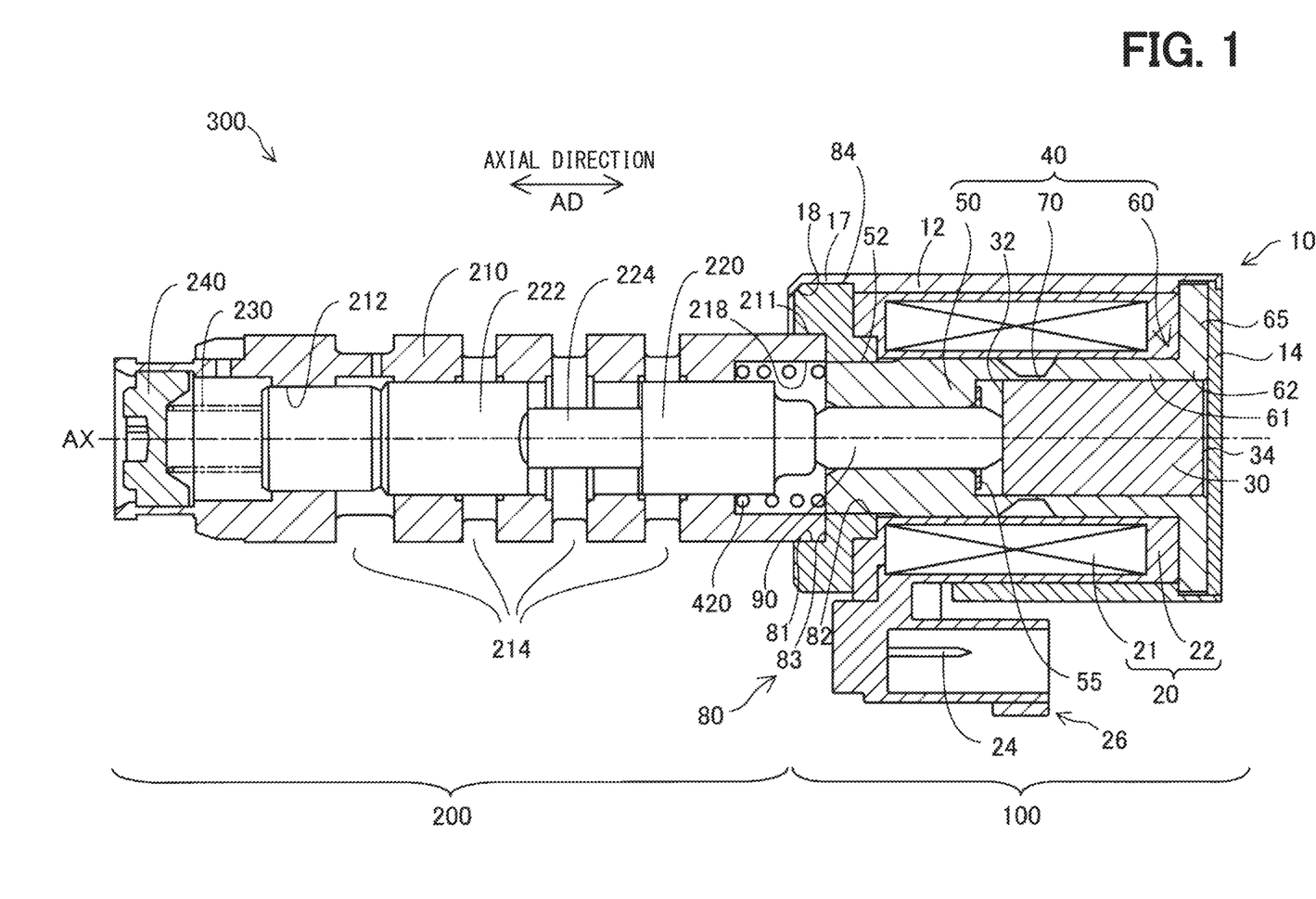
FIG. 1 is a cross-sectional view showing a schematic configuration of a solenoid valve according to a first embodiment.
Figure 2:
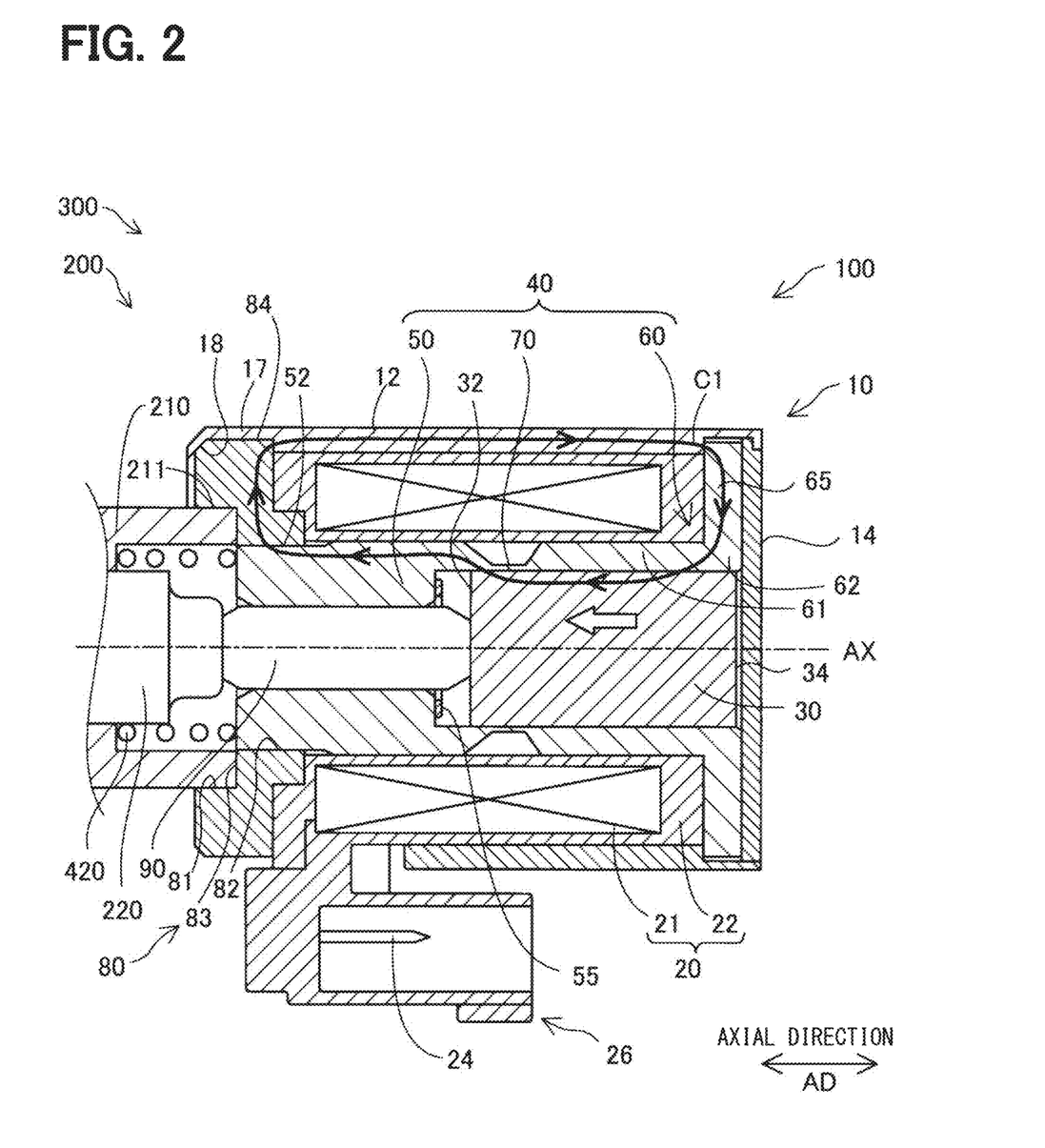
FIG. 2 is a cross-sectional view showing a detailed configuration of a solenoid valve in a vicinity of a base portion.

A solenoid valve 300 of a first embodiment shown in FIG. 1 is a linear solenoid valve, which is used to control the hydraulic pressure of hydraulic oil supplied to an automatic transmission for vehicles (not shown), and is mounted on a valve body provided on an outer surface of a transmission case (not shown). FIG. 1 schematically shows a cross section of the solenoid valve 300 taken along a central axis AX. The solenoid valve 300 includes a solenoid portion 100 and a valve portion 200 arranged side by side along a central axis AX. FIGS. 1 and 2 show the solenoid valve 300 in a non-energized state, and FIG. 2 shows a detailed configuration of the solenoid valve 300 in a vicinity of a base portion 80, which will be described later. The solenoid valve 300 of the present embodiment is a normally closed type, but may be a normally open type.

The valve portion 200 shown in FIG. 1 adjusts an opening area of a plurality of oil ports 214 described later. The valve portion 200 includes a tubular sleeve 210, a valve body 220, a spring 230, and a spring load adjusting member 240. The valve portion 200 is also referred to as a spool valve.

The sleeve 210 has a substantially cylindrical external shape. The sleeve 210 is formed with an insertion hole 212 penetrating along the central axis AX and a plurality of oil ports 214 communicating with the insertion hole 212 and opening in a radial direction. The valve body 220 is inserted into the insertion hole 212. An end of the insertion hole 212 on the solenoid portion 100 side is formed to have an enlarged diameter and functions as an elastic member accommodating portion 218. An elastic member 420 described later is accommodated in the elastic member accommodating portion 218. The plurality of oil ports 214 are formed side by side along a direction parallel to the central axis AX. The direction is hereinafter, referred to as "axial direction AD". The plurality of oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the valve body 220 based on the output hydraulic pressure. The drain port discharges the hydraulic oil. An end outer peripheral surface 211 of the end portion of the sleeve 210 on the solenoid portion 100 side in the axial direction AD (hereinafter, also referred to as "first outer peripheral surface 211" is fastened to the inside of the base portion 80 described later. In the present embodiment, a radial direction means a direction orthogonal to the axial direction AD.

The valve body 220 has a plurality of large-diameter portions 222 and small-diameter portion 224 arranged side by side along the axial direction AD, and has a substantially rod-like external shape. The valve body 220 slides along the axial direction AD inside the insertion hole 212, and adjusts the opening area of the plurality of oil ports 214 according to a position along the axial direction AD between the large-diameter portion 222 and the small-diameter portion 224. A shaft 90 for transmitting the thrust of the solenoid portion 100 to the valve body 220 is arranged at the end of the valve body 220 on the solenoid portion 100 side of the valve body 220. The spring 230 is arranged at the other end of the valve body 220. The spring 230 is configured by a compression coil spring, and presses the valve body 220 in the axial direction AD to urge the valve body 220 toward the solenoid portion 100. The spring load adjusting member 240 is arranged in contact with the spring 230, and adjusts the spring load of the spring 230 by adjusting an amount of screwing into the sleeve 210.

The solenoid portion 100 shown in FIGS. 1 and 2 is energized and controlled by an electronic control device (not shown) to drive the valve portion 200. The solenoid portion 100 includes a yoke 10, a coil portion 20, a plunger 30, a stator core 40, a base portion 80, and the elastic member 420.

The yoke 10 is made of a magnetic metal, and forms an outer shell of the solenoid portion 100. The yoke 10 has a bottomed cylindrical external shape, and accommodates the coil portion 20, the plunger 30, and the stator core 40. The yoke 10 has a side surface portion 12, a bottom portion 14, a thin wall portion 17, and an opening portion 18.

The side surface portion 12 has a substantially cylindrical external shape along the axial direction AD, and is disposed radially outside the coil portion 20. The thin wall portion 17 is connected to an end of the side surface portion 12 on the valve portion 200 side and is a portion having a thickness smaller than that of the side surface portion 12. The thin wall portion 17 constitutes the opening portion 18 of the yoke 10. The thin wall portion 17 is in contact with the base portion 80, which will be described in detail later, and is fixed to the base portion 80.

The bottom portion 14 is formed at the end of the side surface portion 12 and perpendicular to the axial direction AD at the end of the side surface portion 12 opposite to the end opposite to the valve portion 200, and closes the end of the side surface portion 12. The bottom portion 14 is not limited to being perpendicular to the axial direction AD, and may be formed substantially perpendicularly, or may be formed to intersect with the axial direction AD according to the shape of a magnetic flux transfer portion 65 described later. The bottom portion 14 faces a base end surface 34 of the plunger 30 described later.

The coil portion 20 has a tubular shape and is arranged inside the side surface portion 12 of the yoke 10 in the radial direction. The coil portion 20 has a coil 21 and a bobbin 22. The coil 21 is formed of a conducting wire having an insulating coating. The bobbin 22 is made of resin, and the coil 21 is wound around the bobbin 22. The bobbin 22 is connected to the connector 26 arranged on the outer periphery of the yoke 10. A connection terminal 24 to which the end of the coil 21 is connected is arranged inside the connector 26. The connector 26 electrically connects the solenoid portion 100 to the electronic control device via a connection line (not shown). The coil portion 20 generates a magnetic force when energized, and generates a loop-shaped magnetic flux passing through the side surface portion 12 of the yoke 10, the bottom portion 14 of the yoke 10, the stator core 40, the plunger 30, and the base portion 80. (the loop-shaped magnetic flux is hereinafter, referred to as "magnetic circuit C1"). In the state shown in FIGS. 1 and 2, the energization of the coil portion 20 is not performed and a magnetic circuit is not formed. For convenience of explanation, a part of the magnetic circuit C1 formed when the energization of the coil portion 20 is performed is schematically indicated by a thick arrow in FIG. 2.

The plunger 30 has a substantially cylindrical external shape and is made of a magnetic metal. The plunger 30 slides in the axial direction AD on an inner peripheral surface of a core portion 61 of the stator core 40 described later. An end surface of the shaft 90 described above is in contact with the end surface of the plunger 30 on the valve portion 200 side (hereinafter, also referred to as "distal end surface 32"). Thereby, the plunger 30 is urged toward the bottom 14 side of the yoke 10 along the axial direction AD by the urging force of the spring 230 transmitted to the valve body 220 shown in FIG. 1. As shown in FIG. 2, an end surface of the plunger 30 opposite to the distal end surface 32 (hereinafter, also referred to as a "base end surface 34") faces the bottom portion 14 of the yoke 10. The plunger 30 is formed with a breathing hole (not shown) that penetrates in the axial direction AD. The breathing hole allows fluids such as hydraulic oil and air, which are located on the base end surface 34 side and the distal end surface 32 side of the plunger 30, to flow.

The Stator core 40 is made of a magnetic metal, and is disposed between the coil portion 20 and the plunger 30. The stator core 40 is configured by a member in which a magnetic attraction core 50, a sliding core 60, and a magnetic flux passage suppressing portion 70 are integrated.

The magnetic attraction core 50 is disposed so as to surround the shaft 90 in a circumferential direction. The magnetic attraction core 50 constitutes a portion of the stator core 40 on the valve portion 200 side, and magnetically attracts the plunger 30 by the magnetic force generated by the coil portion 20. A stopper 55 is disposed on a surface of the magnetic attraction core 50 facing the distal end surface 32 of the plunger 30. The stopper 55 is made of a non-magnetic material, and suppresses a direct contact between the plunger 30 and the magnetic attraction core 50, and also prevents the plunger 30 from being separated from the magnetic attraction core 50 due to the magnetic attraction. In the present embodiment, an outer peripheral surface (hereinafter, also referred to as "second outer peripheral surface 52") of the end portion on the valve portion 200 side in the axial AD of the magnetic attraction core 50 is fitted with the base portion 80.

The sliding core 60 constitutes a portion of the stator core 40 on the bottom portion 14 side, and is disposed radially outside the plunger 30. The sliding core 60 has a core portion 61 and a magnetic flux transfer portion 65.

The core portion 61 has a substantially cylindrical shape, and is arranged between the coil portion 20 and the plunger 30 in the radial direction. The core portion 61 guides the movement of the plunger 30 along the axial direction AD. As a result, the plunger 30 slides directly on an inner peripheral surface of the core portion 61. There is a sliding gap (not shown) between the core portion 61 and the plunger 30 for ensuring the slidability of the plunger 30. An end portion of the sliding core 60 that is located on an opposite side to the magnetic attraction core 50 side (hereinafter, also referred to as a "core end 62") is in contact with the bottom portion 14.

The magnetic flux transfer portion 65 is formed radially outward from the core end 62 over the entire circumference of the core end 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30. The magnetic flux transfer portion 65 may transfer magnetic flux between the side surface portion 12 of the yoke 10 and the plunger 30. The magnetic flux transfer portion 65 of the present embodiment is formed integrally with the core portion 61. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole.

A magnetic flux passage suppressing portion 70 is formed between the magnetic attraction core 50 and the core portion 61 in the axial direction AD. The magnetic flux passage suppressing portion 70 suppresses the flow of magnetic flux directly between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61.

The base portion 80 is a substantially cylindrical magnetic material member, fastened to the first outer peripheral surface 211 of the sleeve 210, arranged on the outer side in the radial direction of the second outer peripheral surface 52 of the magnetic attraction core 50, and comes into contact with the yoke 10 on the inside of the yoke 10. In the present embodiment, the base portion 80 includes a first inner diameter part 81, a second inner diameter part 82 having an inner diameter smaller than that of the first inner diameter part 81, and a connecting surface 83 that connects the first inner diameter part 81 and the second inner diameter part 82 and is substantially parallel to the radial direction. In the present embodiment, the connecting surface 83 is in contact with the end surface of the sleeve 210 on the valve portion 200 side in the axial direction AD. In the present embodiment, the base portion 80 is press-fitted and fastened to the first outer peripheral surface 211 at the first inner diameter part 81. Further, the base portion 80 is fitted to the second outer peripheral surface 52 at the second inner diameter part 82. Further, in the present embodiment, the base portion 80 is in contact with the side surface portion 12 of the yoke 10 in the axial direction AD on the outer side in the radial direction and on the solenoid portion 100 side in the axial direction AD. The base portion 80 transfers a magnetic flux between the magnetic attraction core 50 of the stator core 40 and the side surface portion 12 of the yoke 10.

An elastic member 420 is accommodated in an elastic member accommodating portion 218 formed in the sleeve 210 of the valve portion 200 and urges the stator core 40 toward the bottom portion 14. The elastic member 420 is arranged in contact with the end surface of the magnetic attraction core 50 in the axial direction AD and on the side opposite to the plunger 30 side. In the present embodiment, the elastic member 420 is configured by a compression coil spring having a substantially cylindrical external shape. The valve body 220 is inserted inside the elastic member 420 in the radial direction. Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

In the present embodiment, the main material of the base portion 80 and the main material of the sleeve 210 are different from each other. Therefore, the degree of freedom in manufacturing the solenoid valve 300 can be increased. The main material is a material having a content of 50% by weight or more. Further, in the present embodiment, the main material of the base portion 80 is a magnetic iron (Fe)-based material. Examples of the magnetic iron-based material include pure iron, low carbon steel, and magnetic stainless steel. The low carbon steel is a steel having a carbon content of 0.025% by weight or less. Further, in the present embodiment, the main material of the sleeve 210 is aluminum (Al). Since it is composed of such a main material, it is possible to secure the strength of the base portion 80 while reducing the weight of the sleeve 210. Further, in the present embodiment, the surface of the sleeve 210 is anodized. Therefore, a surface strength of the sleeve 210 can be increased, and the wear resistance can be improved. In other embodiments, the main material of the base portion 80 may be made of any magnetic material such as nickel or cobalt. Further, the main material of the sleeve 210 may be made of any material other than aluminum (Al).

In the present embodiment, the yoke 10, the plunger 30, and the stator core 40 are each made of iron. They are not limited to iron, they may be composed of any magnetic material such as nickel and cobalt. In the present embodiment, plating is applied on the outer peripheral surface of the plunger 30. By such a plating treatment, the rigidity of the plunger 30 can be increased, and deterioration of slidability can be suppressed. Further, in the present embodiment, the yoke 10 is formed by press molding and the stator core 40 is formed by forging, but each may be formed by any molding method. For example, the yoke 10 may be integrated by caulking fixing, press-fitting fixing, or the like after the side surface portion 12 and the bottom portion 14 are formed separately from each other.

Unlike the states shown in FIGS. 1 and 2, when the coil 21 is energized, a magnetic circuit C1 is formed inside the solenoid portion 100. The plunger 30 is drawn toward the magnetic attraction core 50 by the formation of the magnetic circuit C1 and slides on the inner peripheral surface of the core portion 61 in the axial direction AD. As the current flowing through the coil portion 20 increases, the magnetic flux density of the magnetic circuit C1 increases, and the stroke amount of the plunger 30 increases.

When the plunger 30 moves toward the magnetic attraction core 50, the shaft 90 abutting on the distal end surface 32 of the plunger 30 presses the valve body 220 shown in FIG. 1 toward the spring 230. As a result, the opening area of the oil port 214 is adjusted, and a hydraulic pressure proportional to the value of the current flowing through the coil 21 is output.

Figure 3:
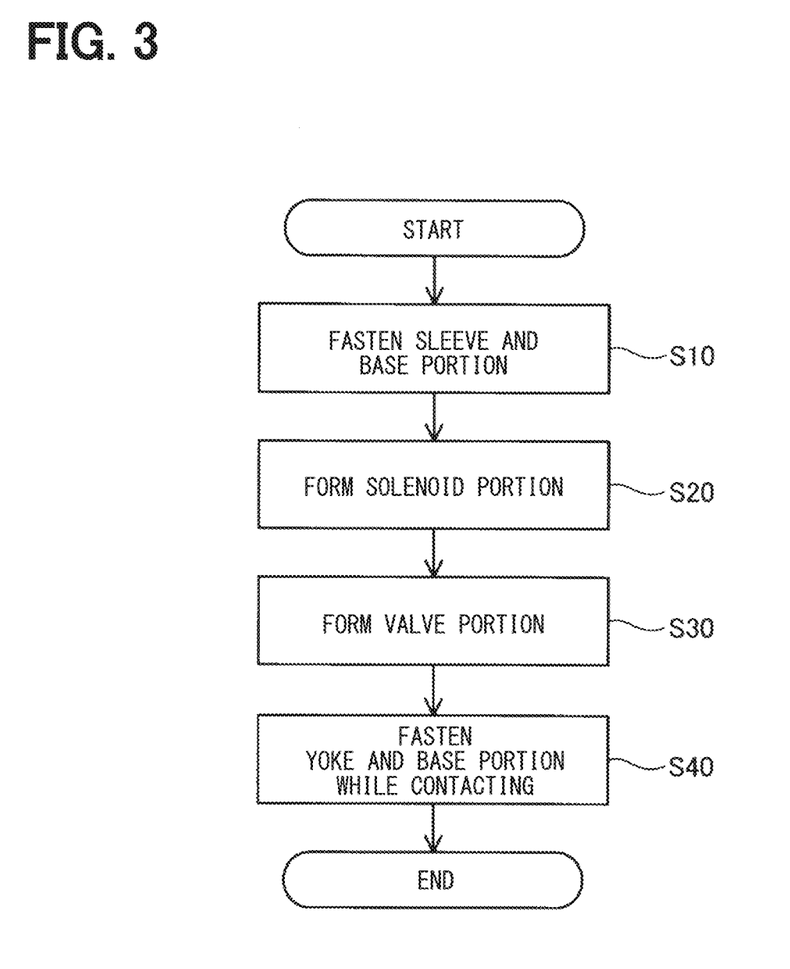
FIG. 3 is a flowchart showing a manufacturing process of a solenoid valve.

As shown in FIG. 3, in a manufacture of the solenoid valve 300 of the present embodiment, the sleeve 210 and the base portion 80 are fastened in step S10. In the present embodiment, the sleeve 210 and the base portion 80 are fastened by press-fitting the first outer peripheral surface 211 of the sleeve 210 into the first inner diameter part 81 of the base portion 80. At this time, the sleeve 210 is inserted until the end surface of the sleeve 210 in an insertion direction comes into contact with the connecting surface 83. That is, the connecting surface 83 exerts a function of positioning in the axial AD when the first outer peripheral surface 211 is press-fitted into a first tubular portion 86.

In step S20, the solenoid portion 100 is formed with respect to an intermediate body in which the sleeve 210 and the base portion 80 formed in step S10 are fastened. For example, a yoke 10 having the thin wall portion 17 substantially parallel to the side surface portion 12 is prepared, and the plunger 30, the stator core 40, the coil portion 20, and the shaft 90 are arranged in the yoke 10. The base portion 80 fastened to the sleeve 210 is arranged radially outside the second outer peripheral surface 52 of the magnetic attraction core 50. In the present embodiment, the base portion 80 is fitted to the second outer peripheral surface 52. The base portion 80 may be slidable with respect to the second outer peripheral surface 52.

In step S30, the valve body 220, the spring 230, and the spring load adjusting member 240 are arranged in the sleeve 210 fastened to the base portion 80 so as to form the valve portion 200.

In step S40, the base portion 80 is fixed to the yoke 10. In the present embodiment, the base portion 80 and the thin wall portion 17 of the yoke 10 are fastened by caulking. In addition, instead of fastening by caulking, an arbitrary method such as welding may be used. The above manufacturing method is an example and may be changed as appropriate. As described above, the solenoid valve 300 is manufactured.

The solenoid valve 300 of the first embodiment described above has the base portion 80. The base portion 80 is fastened to the first outer peripheral surface 211 of the end portion on the solenoid portion 100 side in the axial AD of the sleeve 210, and is arranged outside in the radial direction of the second outer peripheral surface 52 of the end portion on the valve portion 200 side in the radial direction AD of the magnetic attraction core 50. The base portion 80 is fixed to the thin wall portion 17 of the yoke 10. Therefore, the solenoid portion 100 and the valve portion 200 can be fastened by the base portion 80. Therefore, compared with a configuration in which a flange portion is formed on the sleeve 210 of the valve portion 200 and the solenoid portion and the valve portion are fastened by caulking and fixing the flange portion and the yoke 10, the structure of the sleeve 210 can be simplified and the manufacturing cost of the solenoid valve 300 can be suppressed. Further, since the base portion 80 made of the magnetic material is arranged outside the second outer peripheral surface 52 of the magnetic attraction core 50 in the radial direction and comes into contact with the yoke 10 inside the yoke 10, the base portion 80 can transfer the magnetic flux between the magnetic attraction core 50 and the yoke 10. Therefore, it is possible to form a magnetic circuit while suppressing the manufacturing cost.

Further, since the first outer peripheral surface 211 of the sleeve 210 is press-fitted into the base portion 80, the fastening strength between the valve portion 200 and the solenoid portion 100 can be easily controlled by adjusting the dimensions of the first inner diameter part 81 of the base portion 80. It can be easily adjusted.

According to the solenoid portion 100, the sliding core 60 has the tubular core portion 61 arranged radially outside the plunger 30 and the magnetic flux transfer portion 65 formed from the core end 62 of the core portion 61 toward the outside in the radial direction to transfer the magnetic flux. Therefore, there is almost no radial gap between the core portion 61 and the magnetic flux transfer portion 65. It is possible to prevent the core portion 61 and the magnetic flux transfer portion 65 from being eccentric. Therefore, due to such eccentricity, it is possible to suppress the occurrence of radial bias in the distribution of the magnetic flux transmitted from the magnetic flux transfer portion 65 to the plunger 30 via the core portion 61. Therefore, it is possible to suppress an increase in side force due to a bias in the distribution of magnetic flux.

B. Second Embodiment

Figure 4:
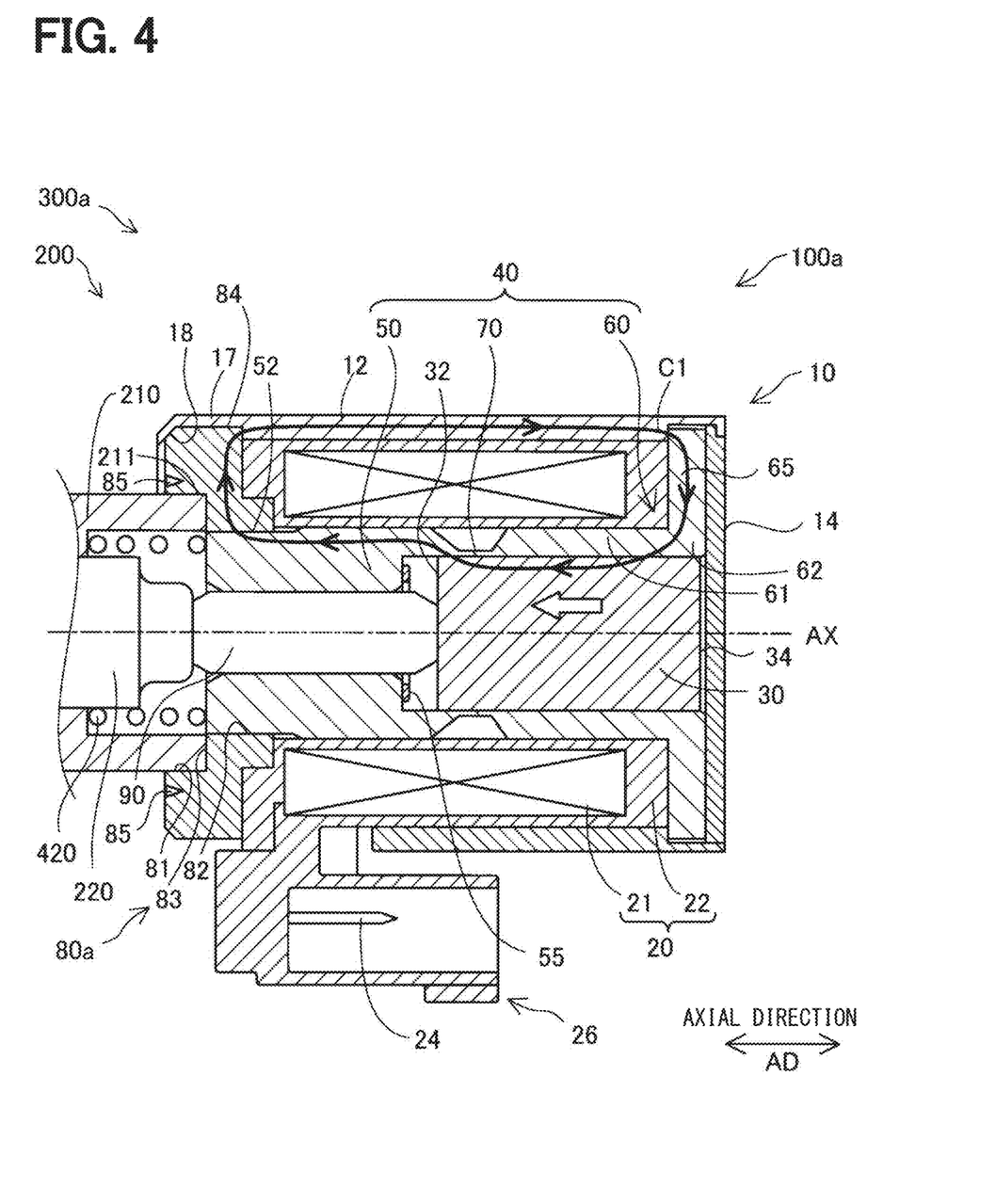
FIG. 4 is a cross-sectional view showing a detailed structure in the vicinity of the base portion of the solenoid valve of a second embodiment.

In the solenoid valve 300 of the first embodiment, the first outer peripheral surface 211 of the sleeve 210 is press-fitted and fastened to the base portion 80. On the other hand, in the solenoid valve 300a of a second embodiment, as shown in FIG. 4, the structure in which the sleeve 210 and the base portion 80a of the solenoid portion 100a are caulked and fixed, and the first outer peripheral surface 211 and the base portion 80a are fastened differs from the first embodiment. FIG. 4 corresponds to FIG. 2 of the first embodiment. Although the explanation by the figure, in the second embodiment, in the caulking portion 85 located on the valve portion 200 side of the base portion 80a, the base portion 80a is crimped to a caulking receiver (not shown) of the first outer peripheral surface 211, and the first outer peripheral surface 211 of the sleeve 210 and the base portion 80a are fastened by caulking. As a method for fastening by caulking, for example, staking caulking or wrapping caulking may be used. Since the other configurations are the same as those of the solenoid valve 300 of the first embodiment, the same configurations are designated by the same reference numerals, and detailed description thereof will be omitted.

According to the solenoid valve 300a of the second embodiment described above, the fastening strength between the valve portion 200 and the solenoid portion 100a can be easily controlled by adjusting a shape when the base portion 80a and the first outer peripheral surface 211 of the sleeve 210 are fastened by caulking, and/or a caulking load.

Further, according to the solenoid valve 300a of the second embodiment, the same effect as that of the first embodiment is obtained except for the effect obtained by press-fitting the first outer peripheral surface 211 of the sleeve 210 into the base portion 80.

C. Third Embodiment

Figure 5:
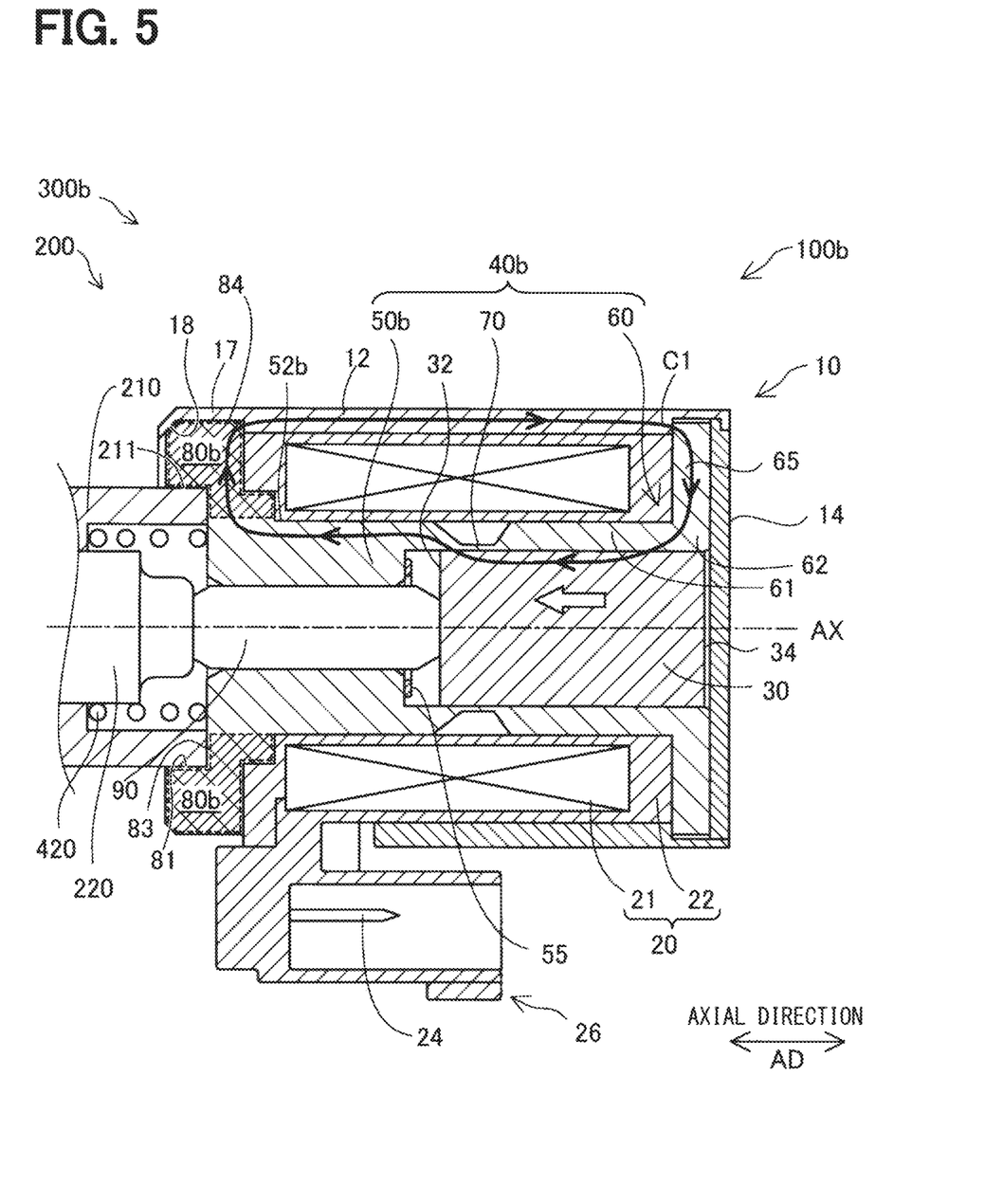
FIG. 5 is a cross-sectional view showing a detailed structure in the vicinity of the base portion of the solenoid valve of a third embodiment.

In the solenoid valve 300 of the first embodiment, the base portion 80 is formed separately from the magnetic attraction core 50 of the stator core 40. On the other hand, the solenoid valve 300b of the third embodiment shown in FIG. 5 is different from the first embodiment in that the base portion 80b is integrated with the magnetic attraction core 50b of the stator core 40b. Of the magnetic attraction core 50b shown in FIG. 5, the portion to which the cross-hatching is attached is a portion corresponding to the base portion 80b in the third embodiment. The portion is located radially outside the second outer peripheral surface 52b of the magnetic attraction core 50b. Since the other configurations are the same as those of the solenoid valve 300 of the first embodiment, the same configurations are designated by the same reference numerals, and detailed description thereof will be omitted.

In the manufacture of the solenoid valve 300b of the third embodiment, for example, the components of the solenoid portion 100b are arranged in the yoke 10, and the first outer peripheral surface 211 of the valve portion 200 is press-fitted into the first inner diameter part 81 of a portion corresponding to the base portion 80a of the stator core 40b. Therefore, the first outer peripheral surface 211 and the base portion 80a, that is, the first outer peripheral surface 211 and the magnetic attraction core 50b of the stator core 40b are fastened.

According to the solenoid valve 300b of the third embodiment, since the base portion 80b is integrated with the stator core 40b, the transfer of magnetic flux from the stator core 40b to the yoke 10 can be made more efficient. Moreover, the same effect as that of the first embodiment is obtained.

D. Other Embodiments (1) In each of the above embodiments, the main material of the base portions 80, 80a, 80b and the main material of the sleeve 210 may be the same as each other. According to this configuration, the coefficient of thermal expansion of the base portions 80, 80a, 80b and the sleeve 210 can be made substantially equal. Therefore, it is possible to suppress the generation of stress due to the difference in the coefficient of thermal expansion between the base portions 80, 80a and the sleeve 210, and the loss of stress generated by press-fitting or fixing by caulking due to the difference in the coefficient of thermal contraction between the base portions 80, 80a and the sleeve 210. The strength of the solenoid valves 300, 300a and 300b can be increased.

(2) In each of the above embodiments, the hardness of the main material of the base portions 80, 80a, 80b and the hardness of the main material of the sleeve 210 may be different from each other. According to this configuration, when the base portions 80, 80a and 80b are press-fitted into the sleeve 210, the side having low hardness is scraped off, so that the location where foreign matter is generated by press-fitting and the main material of the foreign matter can be specified in advance. Therefore, the processing after press-fitting can be appropriately performed.

(3) The base portions 80, 80a, 80b of each of the above embodiments are magnetic members, and are fastened to the first outer peripheral surface 211 of the end on the solenoid portions 100, 100a, and 100b side in the axial direction AD of the sleeve 210. They are arranged on the outer side in the radial direction of the second outer peripheral surfaces 52 and 52b of the end on the valve portion 200 side in the axial direction AD of the magnetic attraction cores 50, 50b, and come into contact with the yoke 10 inside the yoke 10. If the above configuration is provided, various changes can be made. For example, the inner diameters of the base portions 80, 80a and 80b may be substantially constant in the axial direction AD.

(4) The configurations of the solenoid portions 100, 100a and 100b of each of the above embodiments are examples and can be changed in various ways.

For example, the core portion 61 of the sliding core 60 and the magnetic flux transfer portion 65 may be formed separately from each other. In such a configuration, the core portion 61 may be press-fitted into the inner hole of the magnetic flux transfer portion 65 formed in an annular shape. Further, for example, the elastic member 420 is not limited to the compression coil spring, and may be composed of any elastic member such as a disc spring or a leaf spring. The elastic member 420 may be arranged between the coil portion 20 and the magnetic flux transfer portion 65 in the axial direction AD instead of the elastic member accommodating portion 218 to urge the magnetic flux transfer portion 65. Even with such a configuration, the same effect as that of each of the above described embodiments can be obtained.

(5) The solenoid valves 300, 300*a* and 300*b* of each of the above embodiments have been applied to a linear solenoid valve for controlling the hydraulic pressure of hydraulic oil supplied to an automatic transmission for a vehicle, but the present disclosure is not limited thereto. For example, the solenoid valve is not limited to being mounted on the valve body provided on the outer surface of the transmission case, but may be mounted on any hydraulic device that requires control of hydraulic pressure.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid valve, comprising:
   a valve portion; and
   a solenoid portion, wherein
   the valve portion includes
      a tubular sleeve extending along an axial direction, and
      a valve body that is inserted into the sleeve and slides in the axial direction, and in which a shaft for transmitting a thrust of the solenoid portion to the valve portion is arranged at an end on the solenoid portion side in the axial direction,
   the solenoid portion includes
      a tubular coil portion that generates magnetic force when energized,
      a magnetic yoke that have a side surface portion along the axial direction and a bottom portion formed along a direction intersecting the axial direction, and that accommodates the coil portion,
      a columnar plunger that slides in the axial direction,
      a stator core having
         a magnetic attraction core arranged in the axial direction to face a distal end surface of the plunger and configured to attract magnetically the plunger by a magnetic force generated by the coil portion,
         a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and
         a magnetic flux passage suppressing portion configured to suppress passage of magnetic flux between the sliding core and the magnetic attraction core;
   a cylindrical magnetic base portion that is fastened to a first outer peripheral surface of an end on the solenoid portion side in the axial direction of the sleeve, is arranged outside a radial direction of a second outer peripheral surface of the end on the valve portion side in the axial direction of the magnetic attraction core, and comes into contact with the yoke inside the yoke; and
   the base portion is a separate body separated from the tubular coil portion and has a convex part that is inserted into a concave part formed in a part of the coil portion.

2. The solenoid valve according to claim 1, wherein the first outer peripheral surface of the sleeve is press-fitted into an inside of the base portion.

3. The solenoid valve according to claim 1, wherein the base portion and the first outer peripheral surface of the sleeve are fastened by caulking.

4. The solenoid valve according to claim 1, wherein a main material of the base portion and a main material of the sleeve portion are the same as each other.

5. The solenoid valve according to claim 1, wherein a main material of the base portion and a main material of the sleeve are different from each other.

6. The solenoid valve according to claim 2, wherein a hardness of the main material of the base portion and a hardness of the main material of the sleeve are different from each other.

7. The solenoid valve according to claim 6, wherein the main material of the base portion is a magnetic iron-based material, and the main material of the sleeve is aluminum.

8. The solenoid valve according to claim 7, wherein the sleeve is anodized.

9. The solenoid valve according to claim 1, wherein the convex part is formed on an inner circumferential side, and sandwiched between an end of the sleeve and the concave part.

* * * * *